March 24, 1959     C. A. TUDBURY     2,879,366
ELECTRICAL CONDUCTOR FOR INDUCTION HEATING COILS
Filed Oct. 29, 1956

INVENTOR.
CHESTER A. TUDBURY
BY Alfred C. Body
ATTORNEY

2,879,366

ELECTRICAL CONDUCTOR FOR INDUCTION HEATING COILS

Chester A. Tudbury, Cleveland, Ohio, assignor to The Ohio Crankshaft Company, Cleveland, Ohio, a corporation of Ohio Application October 29, 1956, Serial No. 618,720

6 Claims. (Cl. 219—10.79)

The present invention relates to the art of hollow electrical conductors.

The invention is particularly adapted for use in liquid cooled conductors constructed from tubing and used for induction heating coils. It has been found desirable to have one wall of the tubing or conductor thicker than the opposite wall with the thicker wall generally on the side of the tubing or coil nearest the work which is to be induction heated. It is further desirable to have the thicker wall of a wall thickness at least one and a half times the reference depth of the current which flows through the conductor. At room temperature the reference depth at a frequency of 60 cycles in copper is approximately .37 inch. At one kilocycle, this reference depth is just under .090 inch.

One of the main problems in designing and constructing induction heating coils, or hollow electrical conductors, has been to obtain a coil having a wall thickness greater than the reference depth since most commercially available tubing has a wall thickness less than the reference depth. It is well known that commercially available tubing has a wall thickness which permits the tubing to be easily fabricated and coiled and that when the wall thickness of the tubing is greatly increased, it becomes far more difficult to fabricate or coil the tubing. Furthrmore, such tubing becomes more expensive because of the increased amount of copper or other material in the tubing and it is well known that this additional copper on the wall of the tubing or conductor which will be remote from the workpiece is not needed for the conducting of the electrical currents.

Attempts have been made to obtain commercial tubing wherein one wall of the tube has a greater thickness than the opposite wall. However, even though such tubing can be made, it is extremely expensive because it must be manufactured to certain specifications and is not a commercially available standard piece of tubing.

It is also recognized that a large surface area on the inside of the tubing or the conductor will transfer heat generated by the current in the tubing to a liquid coolant, better than a small area will. In commercially available tubing or specially made tubing, the inside surface of the tubing has less area than the outside surface. It is well recognized that if this inside surface area can be increased, the effective cooling of the tubing coil, or the electrical conductor will thus be increased.

The present invention contemplates the overcoming of these problems by means of a hollow electrical conductor which, being of new and novel construction, is economical and easy to fabricate and make, and has an effective wall thickness on one side greater than the wall thickness on the other side.

The invention further contemplates increasing the internal surface area of a hollow electrical conductor adapted to be cooled by passing a coolant fluid through the conductor.

Further, the invention contemplates the new and novel method of making a hollow electrical conductor.

In accordance with the present invention, there is provided an electrical conductor of relatively thin uniform wall thickness tube and electrical conducting means comprising one or more electrically conductive members secured at spaced locations along or at opposite ends of one of the walls of the tube with the conducting means in close proximity with or lying against that wall and within the tube, the tube being formed into an arcuate shape after the conducting means is secured therein and onto the wall which will be on the inside of the coil. Generally the forming of the tube, or bending it into the arcuate shape, pulls the conducting means, member or members, into close proximity with and against the inner wall so that they effectively cooperate with the inner wall to form a wall thickness electrically greater than the wall thickness of the outer wall of the coil.

Further, in accordance with the present invention, the conductor means, member or members secured within the tube are preferably in the form of strips, rods or wires so that their surface area adds to the surface area of the inside of the tube to form a total internal surface area greater than the original internal surface area of the tube, thereby improving the cooling of the conductor because of the increased area for transferring heat between the conductor and the coolant fluid.

In view of the foregoing problems encountered in the prior devices, and the present structures and methods for solving these problems, it is apparent that one of the objects of the present invention is to provide a hollow electrical conductor which is of new and novel construction, is economical and easy to fabricate and manufacture.

Another object of the invention is to provide a hollow electrical conductor which electrically has an effective wall thickness on one side greater than on the other side of the conductor.

A further object of the invention is to provide a hollow electrical conductor which has an enlarged internal surface area for more efficient transfer of heat from the conductor material to a coolant liquid passed through the conductor.

A still further object of the invention is to construct a hollow electrical conductor having one wall thickness effectively greater than another wall thickness by constructing the conductor from relatively thin uniform wall thickness tubing and conductors positioned internally of and in close proximity with one wall of the tubing.

A still further object of the invention is to provide a method of constructing an induction heating coil by securing within a piece of tubing having a relatively thin uniform wall thickness, one or more conductor members and then coiling or bending the tubing and the conductor members into an arcuate shape with the conductor members lying against, or being in close proximity with, one wall of the tubing.

Further objects of the invention will become apparent from the following description of a specific example embodying the invention and the attached claims when taken in conjunction with the accompanying drawings illustrating the described specific example embodying the invention and in which:

Figure 1:
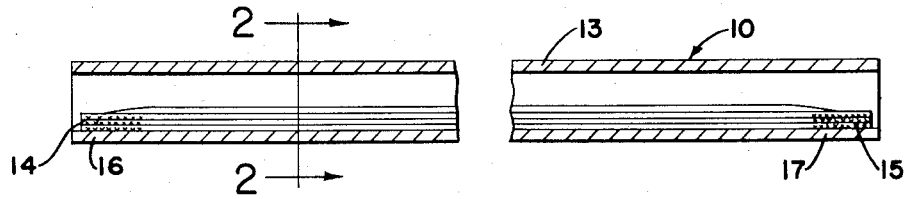
Figure 1 illustrates in cross-section a hollow electrical conductor.
Figure 2:
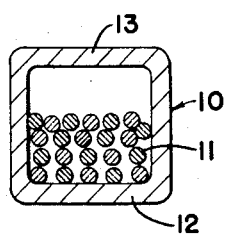
Figure 2 is a sectional view taken approximately along the line 2—2 of Figure 1.

Referring now to the drawings wherein a specific example embodying the invention is illustrated for purposes of description and not of limitation, the hollow electrical conductor has a tube 10 and one or more conductor members 11. The tube 10 is preferably constructed from a piece of standard commercially available, relatively thin, uniform wall thickness material which will conduct electricity and especially current used in the induction heating coil field. In this instance, the tube 10 is illustrated in a somewhat rectangular shape with opposite walls 12 and 13, although it is understood that other shapes of tubing may be used, such, for example, circular, octagonal and so forth, if desired. Located within the tube 10 are the conductor members 11 which may be ordinary wires, rods, flat strips, or the like, and which are illustrated herein in the form of circular wires. The conductor members 11 may be of the same material as, or different material from, the tube and are secured by soldering or other suitable means at spaced locations, such as at the opposite ends 14 and 15 thereof to the opposite ends 16 and 17 respectively of the wall 12 of tube 10. The conductor members 11 extend lengthwise of the tube and in close proximity to or against the wall 12 throughout a substantial portion of the length thereof, and preferably throughout the total length thereof.

The commercially available standard tubing 10 generally has a wall thickness which is less than the reference depth of current which the tube is to conduct. For example, at room temperature, the reference depth at a frequency of 60 cycles in copper is approximately .37 inch and at one kilocycle frequency, this depth is just under .090 inch. Both of these reference depths are greater than the wall thickness of easily obtainable and easily fabricated tubing and thus the thickness of the wall 13 is normally less than the reference depth for the current which the wall is to carry. Since the wall 12 is the same thickness as the wall 13 and in order to have a desired wall thickness at least one and one-half times the reference depth, the conductor members 11 are positioned next to the wall 12 so that they cooperate therewith to effectively provide a combined wall thickness greater than the wall thickness of the commercially available tubing and greater than the reference depth of the current to be carried by the conductor.

It is apparent that the entire surface area within the tube 10 including the internal surfaces of the wall of the tube such as the walls 12 and 13 and the surfaces of the conductor member or members 11 is greater than the original surface area of the inside of the tube 10. This increased surface area on the inside of the tube provides better and improved heat transfer from the conductors to the coolant fluid such, for example, water, which may be passed through the tube 10.

Figure 4:
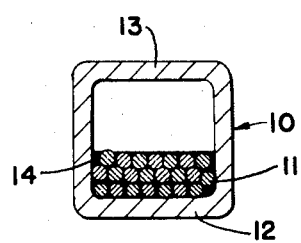
Figure 4 is a sectional view approximately along the line 4—4 of Figure 3.
Figure 3:
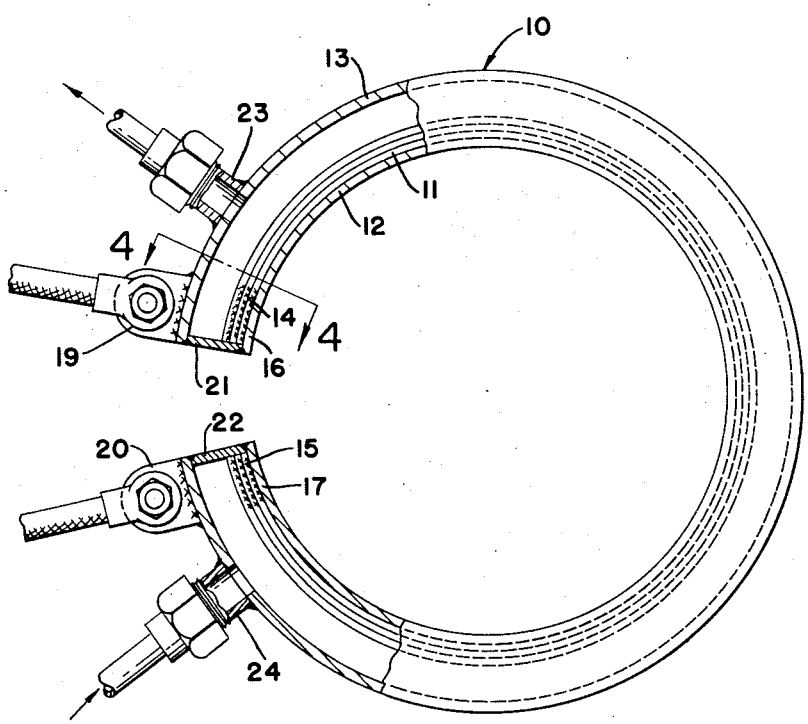
Figure 3 illustrates an induction heating coil constructed from the hollow electrical conductor of Figure 1.

Induction heating coils are easily formed from these hollow electrical conductors, such as the one illustrated in Figure 1, by forming the electrical conductor into a desired shape such, for example, the arcuate shape illustrated in Figure 3. The coil in Figure 3, having been constructed from the hollow electrical conductor of Figure 1, thus has the same wall portions 12 and 13 of the tube 10 and the conductor member or members 11. The tube 10 in this case was bent or formed into the arcuate shape so that the wall 12 would comprise an inner wall of the coil and the wall 13 would comprise an outer wall of the coil. Bending of the tube 10 after the conductor member 11 was secured at the ends 14 and 15 thereof to the ends 16 and 17 of the wall 12 pulls the conductor members 11 into close proximity with and generally tightly against the inner wall 12 as illustrated in Figures 3 and 4. Thus in the completed coil illustrated in Figure 3, there is a hollow electrical conductor having a relatively thin outer wall portion 13 and a relatively thick inner wall portion 12, comprising wall portion 12 and the conductors 11 so that there is sufficient electrical conducting material to conduct current in the induction heating coil next adjacent work-piece which, in this instance, would be placed within the coil, and yet which does not waste the expensive conductive material by having an excessive amount thereof in the outer wall. Furthermore, since the walls 12 and 13 are relatively thin, the tube 10 may easily be obtained on the market and fabricated into the desired shape with the conductor member or members 11 therein.

In this instance, a single turn induction heating coil is illustrated as having electrical connection terminals 19 and 20 on the ends thereof, or on the ends of the tube 10 to permit connection of the tube 10, the conductor members 11 and the resulting coil to the source of electrical energy, such, for example, an induction heating generator. The ends of the tube 10 may be sealed by means of end plates 21 and 22 soldered or otherwise fastened therein to seal the ends of the tube 10 and thereby to control the flow of coolant fluid therethrough. As is well known in the field of cooling hollow electrical conductors, the coolant fluid is fed into and out of the conductor by means of suitable coolant conductors such, for example, the nipples 23 and 24 illustrated herein. In this case, the nipple 23 is fastened by soldering, welding, or otherwise to the wall 13 at one end of the tube 10 and the nipple 24 secured to the wall 13 at the other end of the tube.

The coil and hollow electrical conductor, being of simple construction, is easily fabricated in the following manner: The tubing 10, being of standard commercially available, thin, uniform wall thickness, is first cut to the desired length. Following this, the one or more conductor members 11 are threaded through the tube and soldered or otherwise secured to an internal wall thereof, such as the wall 12 at spaced locations, such as at the opposite ends thereof. In making the coil of Figure 3, the next step is to form the tube 10 into the arcuate shape or such other desired shape as may be desired with the wall 12 being on the inside of the coil and thus closest to the center of the coil. In other words, the somewhat arcuate wall portion 12 is of a radius from the center of the coil less than the wall portion 13. The bending and forming of the coil has pulled the conductor or conductors 11 into close proximity with the wall 12 or thereagainst and as illustrated in Figure 4. Suitable electrical terminals and means for moving coolant fluid through the tube 10 may then be attached to the ends of the tube.

Although the present invention and the specific embodiment has been described in connection with the manufacture of a hollow electrical conductor from a tube which is readily available on the market, it is understood that the invention may be used with intricately shaped induction heating coils or blocks which must be machined from solid pieces, or fabricated in other manners. In such instances, wherein a hollow coolant fluid conducting block must be used, the outer wall may be made relatively thin and to the shape desired. Then, additional conductors, wires or the like may be inserted in the block or coil and fastened to the wall thereof which is to carry the most current, or the wall which is next adjacent the workpiece so that the same advantages as obtained in the herein described preferred example will be had.

It is understood that other modifications of the invention will become apparent to others without departing from the spirit and scope of the invention as hereinafter claimed.

Having thus described my invention, I claim:

1. An electrical conductor comprising, a curved length of hollow tubing of uniform wall thickness, having an inner wall and an outer wall portion, and a length of conductor secured to said inner wall at spaced points and lying thereagainst to effectively provide a hollow electrical conductor with an inner wall thicker than the outer wall.

2. An electrical conductor comprising, a tube of uniform wall thickness having first and second wall portions, and at least a conductor within said tube and secured to said first wall at spaced points and lying thereagainst to effectively provide a hollow electrical conductor with a first wall portion thicker than the second wall portion.

3. An electrical conductor comprising, a somewhat arcuate length of hollow tubing of uniform wall thickness having an inner wall and an outer wall portion, and a plurality of members secured at the ends thereof to said inner wall at spaced points and lying thereagainst to effectively provide a hollow electrical conductor with an inner wall thicker than the outer wall.

4. An induction heating coil comprising, a length of hollow tubing of uniform wall thickness formed into an arcuate shape and having an inner arcuate wall portion and a concentric outer arcuate wall portion, said inner wall portion having opposite ends, conductor means extending through said tube and secured to said opposite ends and in close proximity with said inner wall throughout the length thereof to effectively constitute a coil having one wall portion electrically thicker than another wall portion and to increase the internal surface area of the conductor.

5. An induction heating coil comprising, a hollow member of uniform wall thickness having an inner arcuate wall portion and a concentric outer arcuate wall portion, conductor means within said member and secured to said inner wall and lying in close proximity therewith throughout a major portion of the length thereof to effectively constitute a coil having one wall portion electrically thicker than another wall portion.

6. An induction heating coil comprising, a length of hollow tubing of uniform wall thickness formed into an arcuate shape and having an inner arcuate wall portion and a concentric outer arcuate wall portion, said inner wall portion having opposite ends, conductor means within said tube and secured to said opposite ends and positioned in close proximity with said inner wall throughout at least a major portion of the length thereof to effectively constitute a coil having one wall portion electrically thicker than another wall portion.

References Cited in the file of this patent

UNITED STATES PATENTS

| | | |
|---|---|---|
| 2,434,511 | Osterman et al. | Jan. 13, 1948 |
| 2,455,355 | Combs | Dec. 7, 1948 |
| 2,497,516 | Phelphs | Feb. 14, 1950 |
| 2,663,827 | Baker | Dec. 22, 1953 |